United States Patent
Raz et al.

(10) Patent No.: US 8,947,296 B2
(45) Date of Patent: Feb. 3, 2015

(54) METHOD AND SYSTEM FOR MEASURING A DISTANCE WITH NARROWBAND RADAR

(75) Inventors: Guy Raz, Rehovot (IL); Ron Rotstein, Herzlia (IL)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 13/326,496

(22) Filed: Dec. 15, 2011

(65) Prior Publication Data

US 2013/0154873 A1 Jun. 20, 2013

(51) Int. Cl.
 *G01S 13/08* (2006.01)
 *G01S 7/40* (2006.01)
 *G01S 13/93* (2006.01)

(52) U.S. Cl.
 CPC .............. *G01S 13/08* (2013.01); *G01S 13/931* (2013.01); *G01S 7/4004* (2013.01)
 USPC ............................... 342/174; 342/145; 342/70

(58) Field of Classification Search
 USPC .................................................. 342/173, 174
 See application file for complete search history.

(56) References Cited

U.S. PATENT DOCUMENTS

| | | | | |
|---|---|---|---|---|
| 3,098,225 A | * | 7/1963 | Anderson | 342/129 |
| 5,028,929 A | * | 7/1991 | Sand et al. | 342/26 B |
| 5,578,933 A | * | 11/1996 | Nonaka | 324/639 |
| 6,081,220 A | * | 6/2000 | Fujisaka et al. | 342/26 D |
| 6,489,915 B1 | * | 12/2002 | Lines et al. | 342/26 B |
| 8,659,468 B2 | * | 2/2014 | Pujol et al. | 342/26 B |

* cited by examiner

*Primary Examiner* — Matthew M Barker
(74) *Attorney, Agent, or Firm* — Mark S. Cohen; Pearl Cohen Zedek Latzer Baratz LLP (57) ABSTRACT

A system includes a radar antenna and a radar controller. The radar controller generates two narrowband radar signals, each narrowband radar signal having substantially constant frequency, the frequencies of the two narrowband radar signals differing from one another. The controller operates the radar antenna to transmit each of the generated narrowband radar signals as a transmitted signal, each transmitted signal being characterized by a transmitted power. The controller also measures a received power of received signals that are received by the radar antenna, each received signal including a portion of a corresponding one of the transmitted signals that was returned from an object or from a calibration surface at a known calibration range. A processor operating in accordance with programmed instructions calculates a range to the object on the basis of the transmitted and received powers.

10 Claims, 4 Drawing Sheets

METHOD AND SYSTEM FOR MEASURING A DISTANCE WITH NARROWBAND RADAR

FIELD OF PRESENT INVENTION

The present invention is related to radar measurements.

BACKGROUND

Radar is often used to detect objects and measure their ranges and speeds. For example, a radar system transmitter may transmit a pulse or modulated continuous wave of electromagnetic radiation, e.g. radio waves or microwaves. A radar receiver of the system may receive a pulse that was reflected by the object. The time-of-flight between transmission of the pulse and receiving of the pulse may be converted to a distance of the object.

The transmitted electromagnetic radiation may be formed into a narrow beam, or a radar receiver may be directional. For example, the beam may be shaped by suitable reflecting or refracting optics, or by a phased array. A narrow beam or directional receiver may enable detected objects to be distinguished from one another.

A component of velocity of an object toward or away from a radar system may be measured by exploitation of the Doppler Effect. Thus, measured change in a frequency of a wave, or a measured change in timing of wave pulses, reflected from an object may be indicative of a relative velocity of the object.

SUMMARY

A method includes transmitting a first transmitted narrowband radar signal having a substantially constant first frequency, the first transmitted narrowband radar signal being characterized by a first transmitted power. Concurrently, a second transmitted narrowband radar signal having a substantially constant second frequency is transmitted, the second transmitted narrowband radar signal being characterized by a second transmitted power. A first received power is measured of a first received measurement signal that includes at least a portion of the first transmitted narrowband radar signal that was returned from an object. A second received power is measured of a second received measurement signal that includes at least a portion of the second transmitted narrowband radar signal that was returned from the object. An atmospheric attenuation factor is calculated based on the transmitted and received powers. Concurrently, a first received calibration signal power is measured of a first received calibration signal that includes at least a portion of the first transmitted narrowband radar signal that was returned from a calibration surface. A second received calibration signal power is measured of a second received calibration signal that includes at least a portion of the second transmitted narrowband radar signal that was returned from the calibration surface. An atmospheric attenuation coefficient factor is calculated based on the transmitted powers, on the measured received calibration signal powers, and on the known distance to the calibration surface. A range of the object is calculated based on the calculated atmospheric attenuation factor and on the calculated atmospheric attenuation coefficient factor.

A system includes a radar antenna and a radar controller. The radar controller generates two narrowband radar signals, each narrowband radar signal having substantially constant frequency, the frequencies of the two narrowband radar signals differing from one another. The controller operates the radar antenna to transmit each of the generated narrowband radar signals as a transmitted signal, each transmitted signal being characterized by a transmitted power. The controller also measures a received power of received signals that are received by the radar antenna, each received signal including a portion of a corresponding one of the transmitted signals that was returned from an object or from a calibration surface at a known calibration range. A processor operating in accordance with programmed instructions calculates a range to the object on the basis of the transmitted and received powers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

In accordance with an embodiment of the present invention, a distance to an object may be determined from a measurement of atmospheric attenuation between a narrowband radar system and an object. For example, a narrowband radar system may be incorporated into a vehicle. A narrowband radar system incorporated into a vehicle may enable warning an operator or driver of the vehicle of potential collisions with other vehicles or objects. A narrowband radar system may cooperate with an autonomous or semiautonomous driving or steering system of the vehicle to enable the driving system to control the vehicle so as to avoid collisions.

The narrowband radar system is configured to transmit a continuous wave of electromagnetic radiation at a constant frequency, e.g. in the radio or microwave spectral regions (reference to frequency and wavelength of electromagnetic waves, related via the speed of light, is herein made interchangeably). The narrowband radar system is also configured to receive and measure the intensity of a portion of the transmitted electromagnetic radiation that is returned (e.g. reflected or scattered) by an object or surface. The intensity of the received radiation may be compared to (e.g. divided by) the intensity of the transmitted radiation to yield or produce a calculated reduction in intensity. The reduction in intensity may be dependent on atmospheric attenuation of the radiation, as well as on other factors. The other factors may be related to such considerations as characteristics of a transmitter or receiver antenna, and the radar cross section (RCS) of the object or surface that returned the radiation.

In order to isolate the reduction in intensity due to atmospheric attenuation from the other factors that contribute to the reduction, a concurrent intensity measurement may be made of returned radiation of an additional wavelength. The additional wavelength may be selected so as facilitate isolation of the effects of atmospheric attenuation. For example, two wavelengths may be selected such that the wavelengths are sufficiently close that both radiations are similarly affected by those factors other than attenuation, such as various geometric or RCS-related factors. On the other hand, the two wavelengths may be selected so as to maximize differences in atmospheric attenuation. For example, a suitable pair of wavelengths may be located in the vicinity of an absorption frequency or wavelength of a component of the atmosphere (e.g. water or oxygen molecules). In the vicinity of such an absorption wavelength, small differences in wavelength may result in relatively large differences in atmospheric attenuation.

Atmospheric attenuation of radiation may be affected by both attenuation properties of the atmosphere (e.g. an attenuation coefficient, expressed as attenuation per unit length) for each of the selected wavelengths, and by the distance that the radiation traveled through the atmosphere. The attenuation properties of the atmosphere may vary in response to changes in various conditions (e.g. altitude, atmospheric pressure, humidity). Therefore, in order to extract the distance from the measurements, a concurrent calibration measurement may be made. In the calibration measurement, intensity measurements may be of radiation of the selected frequencies that was returned from a surface with a known range. Thus, as described above, a relative attenuation of the two wavelengths of radiation that are returned from the surface at known range may be calculated from the measurements. Since the distance that the radiation traveled through the atmosphere is known (twice the range), the effects of atmospheric attenuation properties may be isolated from the effects of the range in the calculated relative attenuation.

If the atmospheric attenuation properties are known, e.g. based on a calibration measurement, then a distance traveled by the radiation may be extracted from a calculated relative attenuation. Thus, the measurements may be analyzed to yield a range to the object or surface that returned the radiation.

A narrowband radar system that transmits and receives a radiation of continuous wave of fixed wavelength may present advantages over a wideband system in accordance with some prior art systems. A wideband system, could, for example, transmit and receive radar pulses or modulated waves of radiation. Use of spectral regions of the electromagnetic spectrum may be regulated by a local authority. Radiation emitted by narrowband radar may be made to conform more easily to local regulations then would a wideband system.

Each narrowband radar system that is manufactured may be configured, for example, for a pair of wavelengths that is different from the wavelengths for which at least of some of other manufactured narrowband radar systems are configured. As another example, the wavelengths used by a single narrowband radar system may slowly vary with time. Thus, potential interference between narrowband radar systems when more than one such system are in use in a given region (e.g. when the systems are incorporated into vehicles on a roadway) may be minimal. On the other hand, in a similar situation, wideband radar systems could be more likely to interfere with one another.

Reception of a returned ray by a narrowband radar system may continue for a longer time (e.g. have a longer integration time) than could a wideband radar system (e.g. integration time limited by the length of a pulse or modulation). Thus, a signal-to-noise ratio (SNR) of a narrowband radar system may be made larger than could an SNR of a wideband system.

In addition, radiofrequency (RF) circuitry for a narrowband radar system may be made simpler than could RF circuitry for a wideband radar system.

Figure 1:
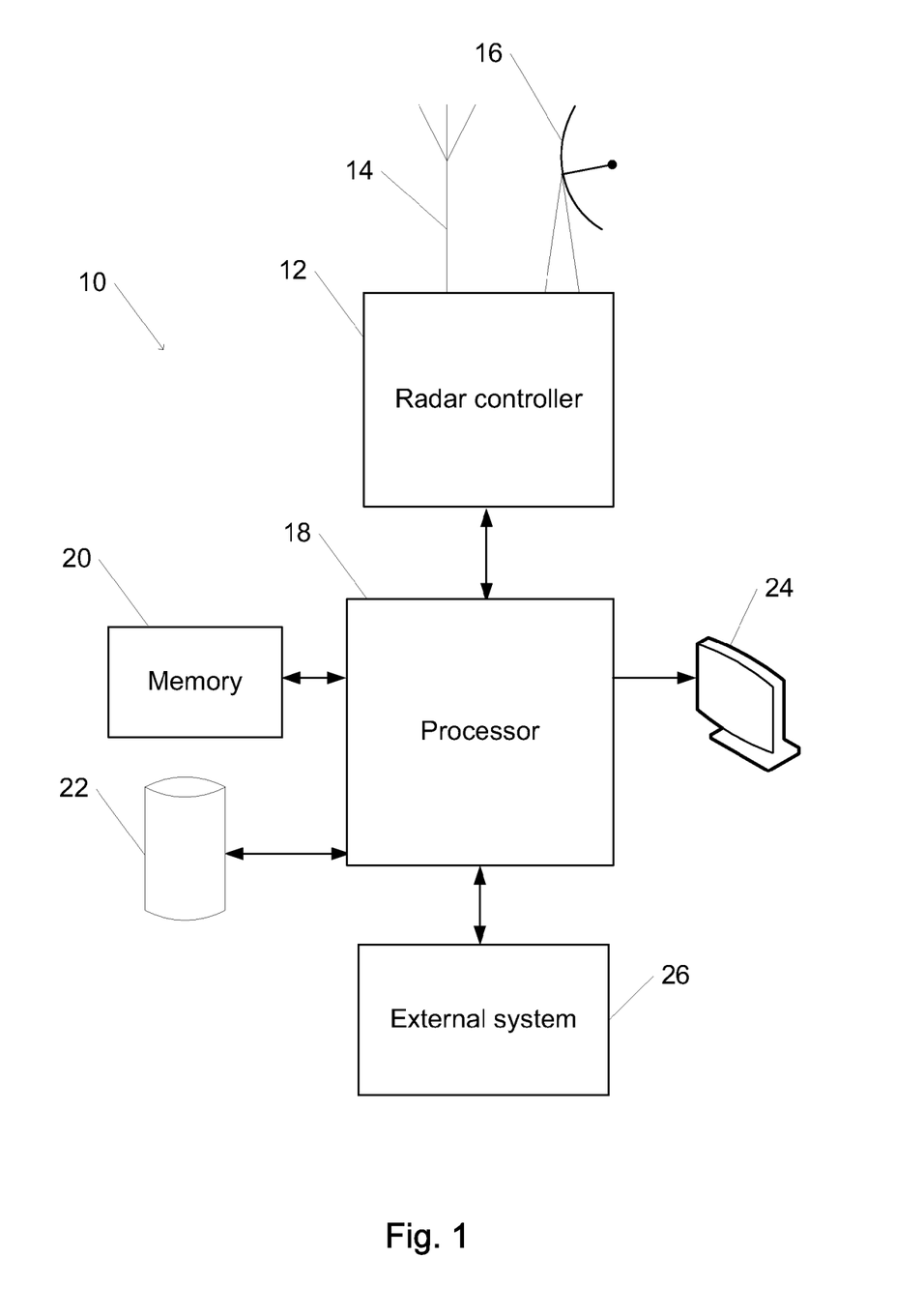
FIG. 1 is a schematic drawing of a system for a narrowband radar system according to an embodiment of the present invention.

FIG. 1 is a schematic drawing of a system for a narrowband radar system according to an embodiment of the present invention.

Narrowband radar system 10 includes radar controller 12. Radar controller 12 may generate a narrowband continuous-wave radar signal. For example, radar controller 12 may be provided with suitable analog circuitry, digital circuitry, or both, for generating a narrowband radar signal. For example, radar controller 12 may be configured to generate a narrowband radar signal of predetermined wavelengths and of predetermined intensities.

The generated narrowband radar signal may be transmitted by transmission antenna 16. For example, transmission antenna 16 may included a directional antenna or array of antennas that is configured to transmit a beam of radiation in a particular direction. Transmission antenna 16 may include two or more directional antennas that may be aimed independently. For example, one antenna may be aimed at distant objects while another may be aimed at a closer surface at a known distance. The angular width of a directional beam may be determined by system resolution requirements. For example, a beam may be configured to resolve a 3 m width (e.g. the width of a lane) at a distance of 100 m, or an angular resolution of about 30 milliradians. Other resolutions are possible. The beam may be aimed using suitable radar optics, for example a suitably shaped reflector or radar lens, or by a transmission by phased array of antennas.

Receiving antenna 14 may receive a narrowband radar signal. For example, receiving antenna 14 may receive narrowband radiation that is transmitted by transmission antenna 16 and returned from a remote (e.g. external to narrowband radar system 10) object or surface. Receiving antenna 14 may include a directional antenna or array of antennas. Receiving antenna 14 may include two or more directional antennas that may be aimed independently. For example, one antenna may be aimed at distant objects while another may be aimed at a closer surface at a known distance. Receiving antenna 14 may be aimed using suitable radar optics, for example a suitably shaped reflector or radar lens, or by a transmission by phased array of antennas.

Thus, transmission antenna 16, receiving antenna 14, or both may be directional.

In accordance with some embodiments of the present invention, radar controller 12 may be configured to scan a directional transmission antenna, a directional receiving antenna, or both, across a sector or field of view. In this manner, radiation returned from different objects within the sector may be detected and their ranges measured. In accordance with other embodiments of the present invention, a directional transmission or receiving antenna may be pointed in a fixed direction. In accordance with other embodiments of the present invention, a narrowband radar system may be provided with a plurality of directional transmission or receiving antennas, each aimed in a different direction.

Radar controller 12 may be configured to receive and process a narrowband radar signal that is received by receiving antenna 14. For example, radar controller 12 may be provided with suitable analog circuitry, digital circuitry, or both, for processing a received narrowband radar signal. For example, radar controller 12 may be configured to measure an intensity of a received narrowband radar signal.

Receiving antenna 14 may be identical to, share components with, or be separate from, transmission antenna 16. For example, receiving antenna 14 and transmission antenna 16 may be located at separate locations within or on a vehicle.

Narrowband radar system 10 may be provided with a processor 18. Processor 18 may be configured to operate in accordance with programmed instructions. Processor 18 may include one or more intercommunicating processing devices. Processor 18 may be incorporated into, may incorporate, may share components with, or may communicate with, radar controller 12. Processor 18 may incorporate, or may be incorporated into, a computer such as an onboard computer of a vehicle, or a system of a vehicle, or any other host processor system Processor 18 may communicate with memory 20. Memory 20 may include one or more volatile or nonvolatile memory devices. Memory 20 may be utilized to store programmed instructions for operation of processor 18, data or parameters for use by processor 18, or results generated during operation of processor 18.

Processor 18 may communicate with data storage device 22. Data storage device 22 may include one or more fixed or removable nonvolatile data storage devices. For example, data storage device 22 may be utilized to store programmed instructions for operation of processor 18, data or parameters for use by processor 18, or results generated during operation of processor 18. For example, programmed instructions stored on data storage device 22 may include instructions to perform a method of performing distance measurements with narrowband radar, in accordance with an embodiment of the present invention.

Results of operation of processor 18 may be communicated to an operator or user of the system. For example, results may be displayed on a display screen 24, or in another visible or audible manner. Results of operation of processor 18 may be communicated with one or more external systems 26. For example, external system 26 may include, be incorporated into, or communicate with, a system for automatic operation of a vehicle. External system 26 may be fully or partially incorporated into, may fully or partially incorporate, or may share components with, processor 18 (e.g. a vehicle onboard processor or any other host processor).

Figure 2:
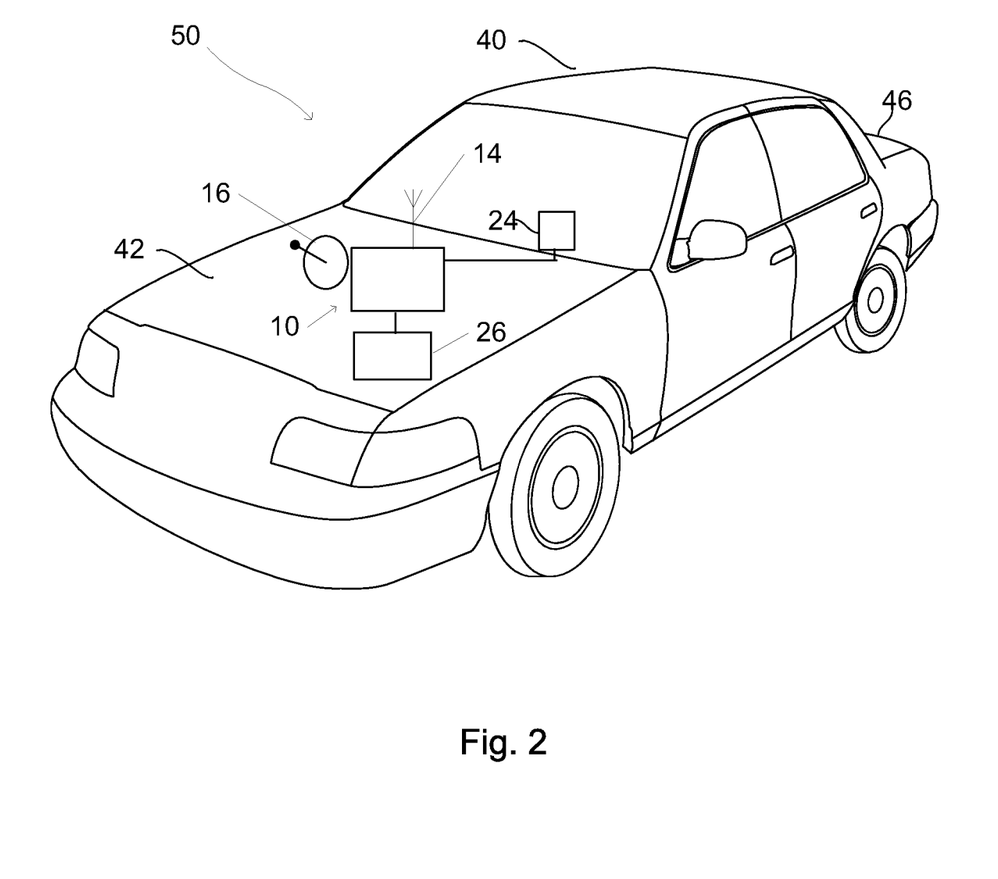
FIG. 2 is a schematic drawing of a system for a narrowband radar system incorporated into a vehicle, according to an embodiment of the present invention.

FIG. 2 is a schematic drawing of a system for a narrowband radar system incorporated into a vehicle, according to an embodiment of the present invention.

Vehicle 50 may include narrowband radar system 10. For example, all or some of components of narrowband radar system 20 may be incorporated into, or housed by, a passenger compartment 40, an engine compartment 42, or a cargo compartment 46 of vehicle 50. Narrowband radar system 10 may display results on display 24. For example, display 24 may be located in a passenger compartment 40 of vehicle 50. For example, display 24 may be visible by a driver or passenger of vehicle 50. Narrowband radar system 10 may communicate with external system 26. For example, external system 26 may include or be incorporated into a warning system of vehicle 50, or an autonomous or semiautonomous control system of vehicle 50. For example, external system 26 may control a steering or braking function of vehicle 50.

Narrowband radar system 10 may be operated in accordance with a narrowband radar system operation method. The narrowband radar system operation method may enable operating the narrowband radar system to measure a range of an object.

A vehicle may include more than one narrowband radar system 10. For example, such multiple systems may operate in turn sequentially, or concurrently looking in different directions. For example, each system may be assigned a different set of wavelengths. Multiple systems may share one or more components.

Figure 3:
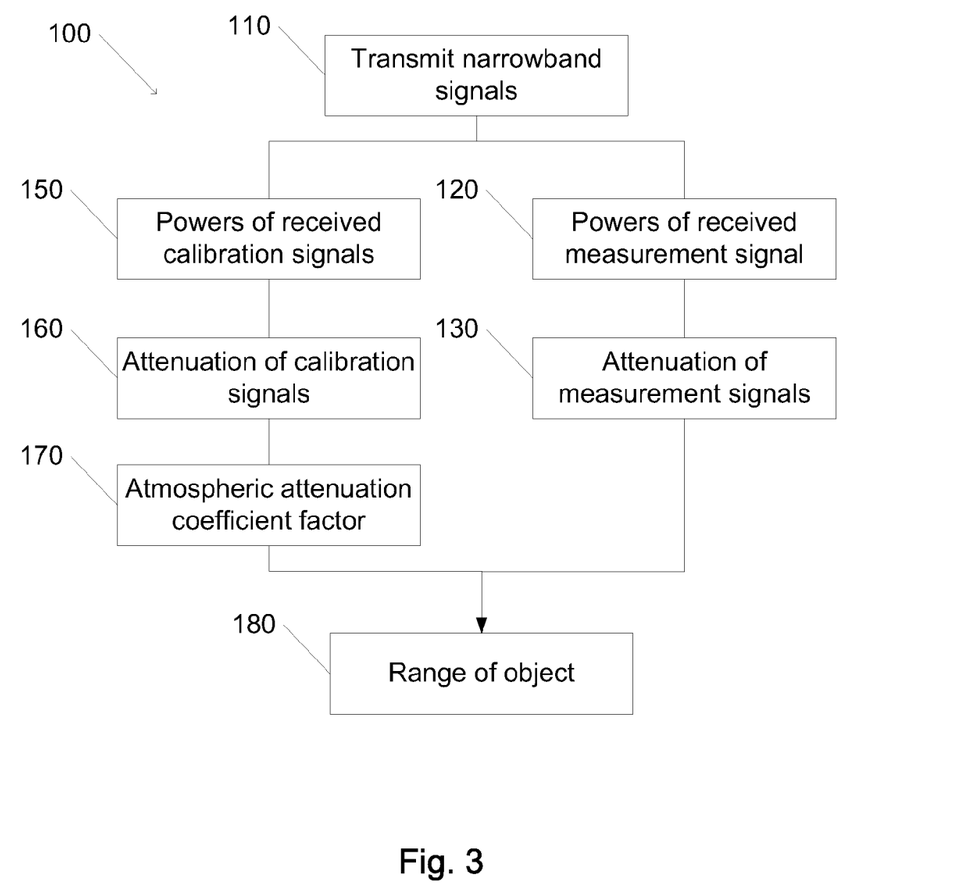
FIG. 3 is a flowchart of a method for operation of a narrowband radar system according to an embodiment of the present invention.

FIG. 3 is a flowchart of a method for operation of a narrowband radar system according to an embodiment of the present invention.

It should be understood with regard to the flowchart, that the illustrated division of the method into discrete operations represented by blocks of the flowchart has been selected for convenience and clarity only. Alternative division of the method into operations represented blocks is possible, with equivalent results. Such alternative division into discrete operations should be understood as included within the scope of embodiments of the present invention.

It should also be understood that, unless indicated otherwise, the illustrated order of operations of the method represented by blocks of the flowchart has been selected for convenience and clarity only. Operations of the method may be executed in a different order, or concurrently, with equivalent results. Such alternative ordering of operations represented by blocks should be understood as included within the scope of embodiments of the invention.

Operations of narrowband radar system operation method 100 may be executed by a processor, radar controller, or both of a narrowband radar system. For example, some operations of narrowband radar system operation method 100 may be executed by a radar controller of a narrowband radar system. Other operations of narrowband radar system operation method 100 may be executed by a processor of the narrowband radar system. As another example, some or all of the functionality of the radar controller or processor may be incorporated within the other.

Figure 4:
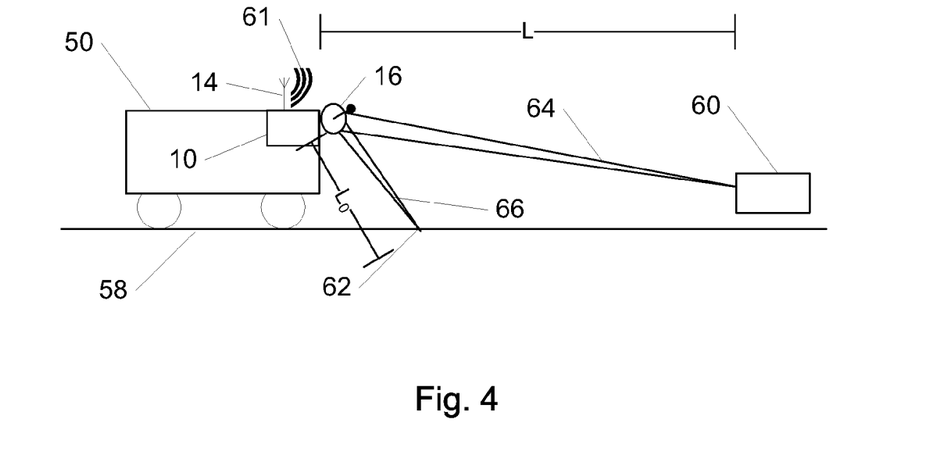
FIG. 4 is a schematic diagram of operation of a vehicle-mounted narrowband radar system according to an embodiment of the present invention.

For example, narrowband radar system operation method 100 may be executed to operate a vehicle-mounted narrowband radar system. A vehicle-mounted narrowband radar system may be operated to measure a range to an object in the vicinity of, or in a projected path of, of vehicle. FIG. 4 is a schematic diagram of operation of a vehicle-mounted narrowband radar system according to an embodiment of the present invention. For example, a narrowband radar system 10 may be mounted on a vehicle 50. Vehicle 50 may be traveling on a roadway 58, or other surface.

In accordance with narrowband radar system operation method 100, transmitted narrowband radar signals (represented collectively by transmitted narrowband radar signal 61) may be transmitted by narrowband radar system 10 toward an object 60 (block 110). For example, transmitted narrowband radar signal 61 may be emitted by an omni-directional, or partially directional, transmitting antenna 14, or by a directional antenna that is pointed toward object 60. (In the example shown, transmission antenna 14 is shown as omni-directional and receiving antenna 16 is shown as directional. The opposite may be true, or both transmission antenna 14 and receiving antenna 16 may be directional, or both transmission antenna 14 and receiving antenna 16 may be a single antenna.)

Transmission of transmitted narrowband radar signal 61 may include emission of two or more continuous electromagnetic waves of different wavelengths (equivalent to different frequencies). For example, selection of the different wavelengths may be selected (as described below) so as to optimize a range calculation that is based on the measurements performed by narrowband radar system 10.

Each of the emitted waves may be emitted with a transmission power $P_T^f$, where the superscript f designates a frequency of the emitted wave. For example, transmission power $P_T^f$ of each wave of transmitted narrowband radar signal 61 may be determined by a wave-generation component of narrowband radar system 10, or measured by a transmitted power monitoring component of narrowband radar system 10.

The various waves of different wavelengths (frequencies) may be emitted concurrently, or may be transmitted sequentially. Sequential emission may require that the waves be emitted within a sufficiently short period of time. For example, during such a sufficiently short period of time, object range L between narrowband radar system 10 (or vehicle 50) and object 60 may not change appreciably (e.g. within the accuracy of the measurement).

The measurement narrowband radar beams may reflect off of object 60 to form measurement signal 64. A portion of measurement signal 64 may be received by a receiving antenna of narrowband radar system 10. A received power $P_R^f$ of each received wave of each frequency f of measurement signal 64 may be measured (block 120).

From the transmission powers of the emitted waves and the received powers of the received waves, attenuation of the wave may be calculated (block 130). For example, a calculated measurement power reduction $M_f$ of a returned measurement waves of frequency f may be expressed as:

$$M_f \equiv \frac{P_R^f}{P_T^f} = G \cdot R \cdot e^{-2\alpha_f L}$$

(With regard to finding a quotient to calculate measurement power reduction $M_f$, and with regard to other quotients discussed below, an inverse quotient may be found. Subsequent calculations may be modified accordingly so as to attain a desired result, such as a measured range.)

Thus, calculated measurement power reduction $M_f$ may depend on various geometric factors, antenna characteristics, instrumentation parameters, or other instrumentation-related factors represented collectively by gain G. Included in gain G may be such factors as, for example, antenna geometry, antenna gain, power-monitoring instrumentation geometry, isotropic path loss, gain factors, or various conversion factors. Dependence on properties of object 60 may be collectively included in radar cross section (RCS) R. For example, RCS R may include such factors as shape factors and geometry of object 60, and electromagnetic surface properties (e.g. reflectance and scattering) of object 60.

Atmospheric attenuation of an emitted wave in traveling from narrowband radar system 10, to object 60, and back to narrowband radar system 10 is included in the exponential factor. The exponent $-2\alpha_f L$ depends on twice range L between narrowband radar system 10 and object 60 (since range L is traversed twice), and frequency dependent atmospheric attenuation coefficient $\alpha_f$. For example, atmospheric attenuation coefficient $\alpha_f$ may be expressed in units of attenuation (e.g. in decibels) per unit length (e.g. in kilometers).

It may be assumed that the frequency dependence of gain factor G and RCS R is much slower than the frequency dependence of atmospheric attenuation coefficient $\alpha_f$. Therefore, the wave frequencies of transmitted narrowband radar signal 61 may be selected such that gain factor G and RCS R are identical for all of the emitted wavelengths. However, for that same set of wave frequencies, while the various emitted waves may be attenuated differently by the atmosphere.

Thus, the atmospheric attenuation may be extracted from the set of calculated intensity reduction $M_f$ for the different wavelengths. For example, the emitted waves of transmitted narrowband radar signal 61 may have two different frequencies, $f_1$ and $f_2$. In this case, the atmospheric attenuation may be isolated by calculating the quotient:

$$\frac{M_{f_1}}{M_{f_2}} = e^{-2(\alpha_{f_1} - \alpha_{f_2})L}$$

An atmospheric attenuation factor may be derived from the atmospheric attenuation by taking its logarithm and dividing by $-2$:

$$(\alpha_{f_1} - \alpha_{f_2})L = -\frac{\ln \frac{M_{f_1}}{M_{f_2}}}{2}$$

If transmitted narrowband radar signal 61 includes waves with more than two wavelengths, the atmospheric attenuation factor may be calculated by a applying a technique based on all of the included waves (e.g. including a least squares fit).

The atmospheric attenuation factor $(\alpha_{f_1} - \alpha_{f_2})L$ depends on both atmospheric attenuation coefficients $\alpha_{f_1}$ and $\alpha_{f_2}$, and on range L. Thus, in order to utilize narrowband radar system 10 to measure a range L to object 60, an independent measurement to an object or surface at a known range $L_0$ may be performed.

Thus, transmitted narrowband radar signal 61 may also be transmitted by transmission antenna 14 of narrowband radar system 10 toward a calibration surface 62 (block 140). For example, transmitted narrowband radar signal 61 may be emitted by a single omni-directional antenna toward both object 60 and calibration surface 62, or separate signals may be emitted by separate directional or partially directional antennas. For example, calibration surface 62 may be a region on a roadway 58 at a fixed calibration range $L_0$ from vehicle 50. Alternatively, calibration surface 62 may be a reflecting surface that is incorporated into, or affixed to, vehicle 50. For example, a directional antenna for emitting a transmitted narrowband radar signal 61 may be aimed (e.g. periodically or permanently) at a constant angle relative to the vertical, or relative to a structure of vehicle 50. Thus, calibration range $L_0$ may remain substantially constant when roadway 58 remains substantially flat or horizontal. For example, in some embodiments of the present invention, calibration range $L_0$ may be equal to a few meters.

As before, transmitted narrowband radar signal 61 may include the same (substantially equal) two or more continuous electromagnetic waves of different wavelengths as described above.

Each of the emitted waves may be emitted with a transmission power $P_{TC}^f$ (where the additional C subscript designates that the power is related to a calibration measurement). For example, transmission power $P_{TC}^f$ of each wave of transmitted narrowband radar signal 61 may be determined by a wave-generation component of narrowband radar system 10, or measured by a transmitted power monitoring component of narrowband radar system 10.

The various waves of different wavelengths (frequencies) may be emitted concurrently, or may be transmitted sequentially. Transmitted narrowband radar signal 61 may be transmitted concurrently, or sequentially, toward object 60 and toward calibration surface 62.

Transmitted narrowband radar signal 61 may be returned (reflected or scattered), by calibration surface 62. A portion of the returned beams may be received by a receiving antenna of narrowband radar system 10 as calibration signal 66. A received power $P_{RC}^f$ of each received wave of each frequency f of calibration signal 66 may be measured (block 150).

From the transmission powers of the emitted waves and the received powers of the received waves, attenuation of each wave may be calculated (block 160). For example, a calculated calibration power reduction $C_f$ of a returned measurement waves of frequency f may be expressed as:

$$C_f \equiv \frac{P_{RC}^f}{P_{TC}^f} = G \cdot R \cdot e^{-2\alpha_f L_0}$$

Thus, calculated calibration power reduction $C_f$ may depend on various geometric factors, antenna characteristics, instrumentation parameters, or other instrumentation-related factors represented collectively by gain G. Dependence on properties of calibration surface 62 may be collectively included in RCS R. Values of gain factor G and RCS R may differ from the similarly designated factors in the formula for the measurement power reduction $M_f$ described above.

Atmospheric attenuation of an emitted wave in traveling from narrowband radar system 10, to calibration surface 62, and back to narrowband radar system 10 is included in the exponential factor. The exponent $-2\alpha_f L_0$ depends on twice calibration range $L_0$ between narrowband radar system 10 and calibration surface 62 (since calibration range $L_0$ is traversed twice), and frequency dependent atmospheric attenuation coefficient $\alpha_f$. Values of atmospheric attenuation coefficient $\alpha_f$ are assumed to be substantially identical in the formulas for calibration power reduction $C_f$ and for measurement power reduction $M_f$.

As described above, it may be assumed that the frequency dependence of gain factor G and RCS R is much slower than the frequency dependence of atmospheric attenuation coefficient $\alpha_f$. Therefore, the wave frequencies of measurement narrowband radar beam 64 may be selected such that gain factor G and RCS R are identical for all of the emitted wavelengths. However, for that same set of wave frequencies, while the various emitted waves may be attenuated differently by the atmosphere.

Thus, the atmospheric attenuation may be extracted from the set of calculated calibration power reduction $C_f$ for the different wavelengths. For example, the emitted waves of calibration narrowband radar beam 66 may have two different frequencies, $f_1$ and $f_2$. In this case, the calibration atmospheric attenuation may be isolated by calculating the quotient:

$$\frac{C_{f_1}}{C_{f_2}} = e^{-2(\alpha_{f_1} - \alpha_{f_2})L_0}$$

An atmospheric attenuation factor may be derived from the atmospheric attenuation by taking its logarithm and dividing by $-2$:

$$(\alpha_{f_1} - \alpha_{f_2})L_0 = -\frac{\ln \frac{C_{f_1}}{C_{f_2}}}{2}$$

If calibration narrowband radar beam 66 includes waves with more than two wavelengths, the atmospheric attenuation factor may be calculated by a applying a technique based on all of the included waves (e.g. including a least squares fit).

Since calibration range $L_0$ is known, the atmospheric attenuation coefficient factor $(\alpha_{f_1} - \alpha_{f_2})$ may be isolated (block 170). For example, the calibration atmospheric attenuation factor $(\alpha_{f_1} - \alpha_{f_2})L_0$ may be divided by $L_0$.

Once atmospheric attenuation coefficient factor $(\alpha_{f_1} - \alpha_{f_2})$ is known, the range L of object 60 may be isolated from the atmospheric attenuation factor $(\alpha_{f_1} - \alpha_{f_2})L$ that was calculated above (block 180). Thus narrowband radar system operation method 100 may be executed on narrowband radar system 10 to measure a range L of an object 60.

Typically, as when narrowband radar system 10 is mounted on a land or sea vehicle, atmospheric attenuation coefficient factor $(\alpha_{f_1} - \alpha_{f_2})$ varies slowly with time. For example, atmospheric attenuation coefficient factor $(\alpha_{f_1} - \alpha_{f_2})$ may vary in response to change in atmospheric or meteorological conditions (e.g. temperature, air pressure, relative humidity) or in response to a change in altitude of narrowband radar system 10. Thus, a long term temporal average, e.g. over a plurality of measurements of atmospheric attenuation coefficient factor $(\alpha_{f_1} - \alpha_{f_2})$, may be used in such cases. For example, such a calibration measurement period may extend for several seconds or tens of seconds. Thus, the SNR of the calibration measurement may be increased (and hence the resulting range measurement improved). In this manner, effects of momentary changes in calibration range L0 (e.g. due to a bump or depression on a roadway 58, or to a hill top or to a valley) may be averaged out over the calibration measurement period. This temporal average may be a sliding average.

A distance to calibration surface 62 may be selected by a desired to maximize calibration range $L_0$ (so as to increase accuracy of the calculation of the attenuation coefficient factor), on the one hand, while minimizing calibration range $L_0$, on the other (so as to increase the accuracy with which the location of calibration surface 62 is known, and to increase the intensity of radiation that is returned backward from calibration surface 62).

For example, in some embodiments of the present invention, calibration range $L_0$ may be selected to be a few meters. In accordance with some embodiments of the present invention, calibration range $L_0$ may be variable by narrowband radar system 10. For example, when the intensity of returned radiation from calibration surface 62 decreases (e.g. due to especially large atmospheric attenuation or due to a surface that poorly reflects radiation back to narrowband radar system 10), calibration range $L_0$ may be decreased accordingly.

Calibration measurements may be interspersed with object range measurements, or may be made in parallel (e.g. using different antenna, controller, or processor components).

Embodiments of a narrowband radar system may be utilized to directly measure a relative velocity of an object toward or away from narrowband radar system 10. For example, a Doppler shift in wavelength or frequency of a wave after reflection from an object 60 may be measured. The relative velocity of object 60 may then be calculated from the measured Doppler shift. As another example, a relative velocity may be derived from a series of range measurements made at known intervals.

In addition, when a single antenna is used for both transmitting and receiving a wave, a Doppler shift of the received wave may simplify distinguishing between the transmitted and received signals. For example, a frequency filter may be incorporated in circuitry associated with receiving returned waves. The filter may be applied to filter out signals having the frequency of the transmitted radiation.

When an object 60 is stationary with respect to narrowband radar system 10 (e.g. both narrowband radar system 10 and object 60 are stationary, or both are moving with the same velocity), a Doppler effect may not be used to distinguish between transmitted and received radiation. In such a case, separate antennas for transmission and receiving may be advantageous.

A set of wavelengths may be selected so as to increase or optimize the accuracy of range measurements. An ideal set of wavelengths would have identical interactions with objects, surfaces, and components of a narrowband radar system, implying wavelengths that are close to one another. Nearby wavelengths may also enable simplified radiofrequency (RF) circuitry and antenna design, as a single design may be configured to handle all wavelengths. On the other, an ideal set of wavelengths would be subject to appreciably varied atmospheric attenuation.

Figure 5:
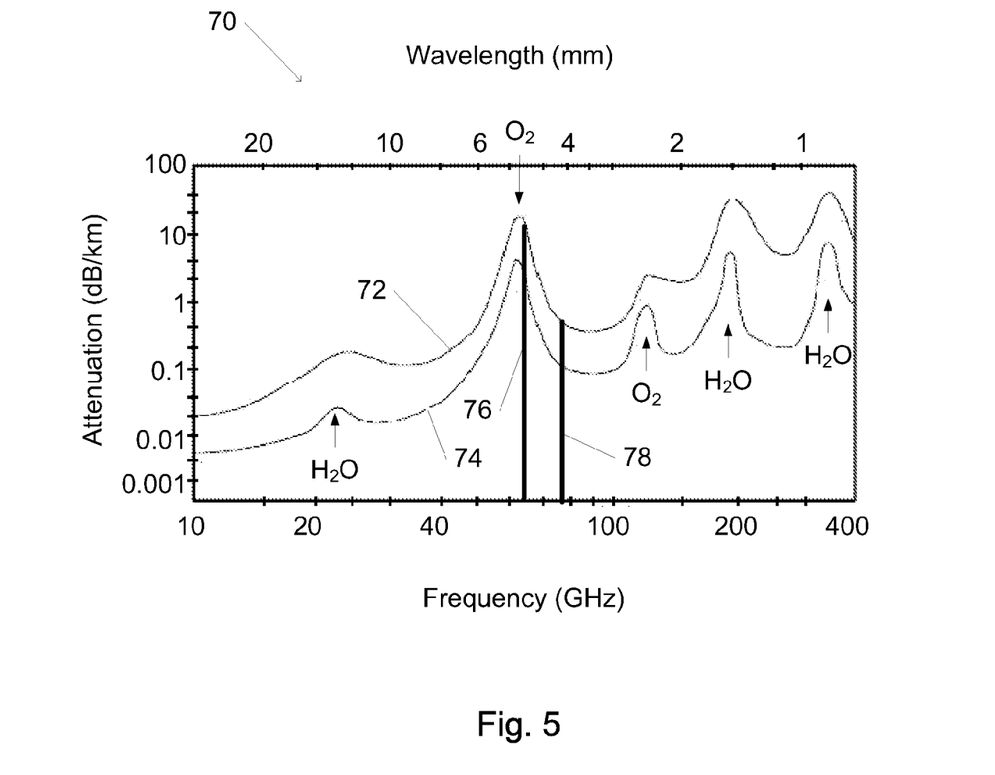
FIG. 5 illustrates selection of wavelengths a narrowband radar system according to an embodiment of the present invention.

FIG. 5 illustrates selection of wavelengths a narrowband radar system according to an embodiment of the present invention.

Attenuation graph 70 illustrates atmospheric attenuation of electromagnetic radiation (in units of decibels per kilometer) as a function of wavelength (in units of millimeters), and frequency (in units of gigahertz). The atmospheric attenuation is given at sea level (attenuation coefficients curve 72), and for an altitude of 9150 meters (attenuation coefficients curve 74). Attenuation coefficients curves 72 and 74 may be characterized by attenuation peaks whose maximums occurring at attenuation peak frequencies. Each attenuation peak may primarily result from absorption or scattering of electromagnetic radiation by a specific component of the atmosphere. Each peak of attenuation coefficients curves 72 and 74 is labeled by the corresponding atmospheric component. In the spectral range shown, attenuation peaks result from either atmospheric water vapor ($H_2O$) or from atmospheric oxygen ($O_2$) molecules. In particular, a sharp attenuation peak (with peak attenuation of about 15 dB/km, having full width at half maximum of about 10 GHz, and resulting from attenuation by atmospheric oxygen molecules) occurs in both attenuation coefficients curves 72 and 74 at a peak frequency of about 60 GHz, corresponding to a peak wavelength of about 5 mm.

In order to maximize the difference in atmospheric attenuation coefficient for two waves of similar frequency, two frequencies may be selected such that one is located near an attenuation peak, and the other is near a tail end of the attenuation peak. For example, a frequency may be considered to be near the peak frequency when the corresponding attenuation of the frequency is greater than an upper threshold fraction of the peak attenuation. Similarly, a frequency may be considered to be a tail end of an attenuation peak when the corresponding attenuation of the frequency is less than a lower threshold fraction of the peak attenuation.

For example, waves having two such frequencies may be represented by vertical bars 76 and 78. The frequency represented by vertical bar 76 is located near the 60-GHz $O_2$ attenuation peak (at about 64 GHz), corresponding to an attenuation coefficient of about 11 dB/km (or greater than about 70% of peak attenuation). The frequency represented by vertical bar 78, on the other hand, is located near a tailing end of the 60-GHz $O_2$ attenuation peak (at about 77 GHz), and corresponds to an attenuation coefficient of about 0.4 dB/km (or less than about 3% of peak attenuation). On the other hand, the wavelengths of the corresponding waves, about 4.7 mm and 3.9 mm, respectively, may be sufficiently similar such that the geometrical components of gain factor G, and RCS R are similar for both corresponding waves.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method comprising:
   transmitting a first transmitted narrowband radar signal having a substantially constant first frequency, the first transmitted narrowband radar signal being characterized by a first transmitted power;
   concurrently transmitting a second transmitted narrowband radar signal having a substantially constant second frequency, the second transmitted narrowband radar signal being characterized by a second transmitted power;

measuring a first received power of a first received measurement signal that includes at least a portion of the first transmitted narrowband radar signal that was returned from an object, and a second received power of a second received measurement signal that includes at least a portion of the second transmitted narrowband radar signal that was returned from the object;

calculating an atmospheric attenuation factor based on the transmitted and received powers;

calculating a range of the object based on the calculated atmospheric attenuation factor and on an atmospheric attenuation coefficient factor.

2. The method of claim 1, wherein the atmospheric attenuation coefficient factor is calculated by measuring a first received calibration signal power of a first received calibration signal that includes at least a portion of the first transmitted narrowband radar signal that was returned from a calibration surface, and a second received calibration signal power of a second received calibration signal that includes at least a portion of the second transmitted narrowband radar signal that was returned from the calibration surface, and calculating the atmospheric attenuation coefficient factor based on the transmitted powers, on the measured received calibration signal powers, and on the known calibration range.

3. The method of claim 2, wherein measuring the first received calibration signal power or the second received calibration signal comprises averaging a plurality of measurements.

4. The method of claim 2, wherein transmitting the first narrowband radar signal or the second narrowband radar signal comprises transmitting a directional beam of radar radiation toward either an object or a calibration surface.

5. The method of claim 2, wherein the first frequency and the second frequency are selected such that a radar cross section (RCS) of the object or of a calibration surface is substantially identical for the first narrowband radar signal and the second narrowband radar signal.

6. The method of claim 5, wherein the first frequency is selected such that an atmospheric attenuation coefficient corresponding to the first frequency is greater than a predetermined upper threshold fraction of a peak attenuation for an atmospheric attenuation peak, and the second frequency is selected such that an atmospheric attenuation coefficient corresponding to the second frequency is less than a predetermined lower threshold fraction of the peak attenuation for the same atmospheric attenuation peak.

7. The method of claim 6, wherein calculating the range of the object comprises calculating a quotient of the calculated atmospheric attenuation factor and the calculated atmospheric attenuation coefficient factor.

8. The method of claim 2, wherein a calibration surface comprises a region of a roadway substantially at a calibration range.

9. The method of claim 1, wherein calculating the atmospheric attenuation factor comprises calculating a logarithm of a quotient of a power reduction of the first received power relative to the first transmitted power, and of a power reduction of the second received power relative to the second transmitted power.

10. The method of claim 1, comprising measuring a relative velocity of the object by comparing a shift in frequency between the received measurement signal and its corresponding transmitted narrowband radar signal.

* * * * *